(12) United States Patent
Jolly et al.

(10) Patent No.: US 6,302,249 B1
(45) Date of Patent: Oct. 16, 2001

(54) LINEAR-ACTING CONTROLLABLE PNEUMATIC ACTUATOR AND MOTION CONTROL APPARATUS INCLUDING A FIELD RESPONSIVE MEDIUM AND CONTROL METHOD THEREFOR

(75) Inventors: Mark R. Jolly, Raleigh; Richard Wilder, Fuquay-Varina, both of NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/264,273

(22) Filed: Mar. 8, 1999

(51) Int. Cl.$^7$ ........................................................ F16F 9/06
(52) U.S. Cl. ................................................................ 188/269
(58) Field of Search .............................. 188/267, 269, 188/267.1, 267.2, 312–315, 322.16, 322.19, 322.5; 267/140.11–140.15, 64.11, 14.15

(56) References Cited

U.S. PATENT DOCUMENTS

| | | |
|---|---|---|
| H1292 | 3/1994 | Marsh . |
| 4,528,894 | 7/1985 | Crosby ........................................ 92/12 |
| 5,158,109 * | 10/1992 | Hare ..................................... 137/514.3 |
| 5,277,281 | 1/1994 | Carlson et al. ......................... 188/267 |
| 5,284,330 | 2/1994 | Carlson et al. ......................... 267/140 |
| 5,353,839 | 10/1994 | Kordonsky et al. .................... 137/806 |
| 5,366,048 * | 11/1994 | Watanabe ............................... 188/267 |
| 5,452,745 | 9/1995 | Kordonsky et al. .................... 137/807 |
| 5,492,312 | 2/1996 | Carlson ............................... 267/140.14 |
| 5,599,474 | 2/1997 | Weiss et al. . |
| 5,683,615 | 11/1997 | Munoz ................................. 252/62.52 |
| 5,705,085 | 1/1998 | Munoz et al. ....................... 252/62.52 |
| 5,711,746 | 1/1998 | Carlson ................................. 482/112 |
| 5,816,372 | 10/1998 | Carlson et al. ..................... 188/267.2 |
| 5,842,547 | 12/1998 | Carolson et al. ...................... 188/267 |

FOREIGN PATENT DOCUMENTS

| | | |
|---|---|---|
| 0 322 503 | 7/1988 | (EP) . |
| 1601685 | 4/1954 | (FR) . |
| WO 98/00653 | 1/1998 | (WO) . |

OTHER PUBLICATIONS

"Magnetorheological Fluid Actuators" J. David Carlson. Adaptronics ansd Smart Structures. D.J. Jendrizta and H. Janocha, Eds., Springer Verlag, (1997) in–press.

(List continued on next page.)

Primary Examiner—Christopher P. Schwartz
Assistant Examiner—Clifford Bartz
(74) Attorney, Agent, or Firm—Michael M. Gnibus

(57) ABSTRACT

A controllable pneumatic apparatus including a pneumatic actuator coupled with a linear-acting brake including a field responsive medium. The pneumatic actuator has a housing with a gas cavity, a first piston slidably disposed in the gas cavity subdividing the gas cavity into first and second gas chambers, and an output member coupled to the first piston. The linear-acting controllable brake includes a medium containing cavity subdivided into a first and second chambers, and a second piston rigidly interconnected with, and longitudinally aligned with, the first piston. A passageway interconnects the first and the second chambers and a field responsive medium (e.g., a magnetic fluid) is contained in the passageway. A field generator produces a field to change a rheology of the medium and cause a braking force to be applied to the output member to control motion thereof. A preferable control method implements motion control based upon the kinetic energy and the braking force in the system.

24 Claims, 9 Drawing Sheets

OTHER PUBLICATIONS

Lord Corporation's brochure entitled "Rheonetic Magnetic Fluid Systems" 1/96.

PHD, Inc.'s Brochure entitled "Series A3,A3V, H3V Three position; ¾", 1", 1–⅛", 1–⅜" Bore".

Bimba Manufacturing Company's Brochure entitled "Bimba Position Feedback Cylinder" Price Catalog PFC 396–B 3/96.

SMC Corporation's Brochure entitled Rodless Cylinder with Brake and Positioning Scale Series ML2B 025, 032, 040. 11/97.

Festo Corporation'"s Brochure entitled "Servopneumatics.. A New Alternative Solution for High Speed, Accurate Positioning" 1/97.

The Rexroth Corporation's Brochure entitled "Electro/Pneumatic Devices" SC–600 11/97.

"Magnetorheological Damping Devices" A.V. Kolomentzev, V.I. Kordonskii, and I.V. Prokhorov. *Magnitnaya Gidrodinamika,* No. 2, pp. 104–108, Apr.–Jun., 1988.

Robohand, Inc.'s brochure entitled "Positione Pneumatic Motion Control Components" 1/98.

"Pneumatic Handbook, $5^{th}$ Edition" 1978, Trade and Technical Press, Morden UK XP002141819, p. 184, figure 1.

* cited by examiner

LINEAR-ACTING CONTROLLABLE PNEUMATIC ACTUATOR AND MOTION CONTROL APPARATUS INCLUDING A FIELD RESPONSIVE MEDIUM AND CONTROL METHOD THEREFOR

FIELD OF THE INVENTION

The invention relates to pneumatic apparatus. More particularly, the present invention is directed to a pneumatic apparatus which is precisely controllable.

BACKGROUND OF THE INVENTION

For industrial applications, it is sometimes desired to accurately position items in assembly or manufacturing processes, such as in a packaging, tensioning, positioning, stacking, guiding, pick-and-place or other industrial automation applications. Many times, pneumatic actuators are used to provide the motive force for such applications. In simple operations, certain simple pneumatic actuators are utilized. The simplest types are 2-position pneumatic actuators only capable of stopping at the end positions, i.e., all the way to one end or all the way to the other end of the stroke. Although cost effective, they are only useful in a very limited set of automation applications.

More sophisticated pneumatic actuators, such as the TOM THUMB® 3-position pneumatic actuator sold by PHD, Inc. of Fort Wayne, Ind., includes the ability to stop at an intermediate or middle position. Although more flexible than 2-position actuators, these 3-position actuators are still very inflexible, in that, once designed, the intermediate position is largely unchangeable.

In the next level of sophistication, actuators are available which can stop at any intermediate position. For example, SMC Corporation of Tokyo, Japan manufactures a rodless pneumatic cylinder with an internal brake and positioning scale (e.g. model ML2B). This system includes a piston moveable within a housing and integral position sensor and a friction brake. The position sensor provides a position signal to the controller. By comparing the instantaneous position with inputted desired position data, the brake is actuated via air pressure to move a brake shoe into contact with a brake plate, thereby stopping the piston at the predetermined intermediate point. The system includes the ability to learn the distance from application of the brake to the actual stopping point, and makes adjustments to improve the accuracy for at the next commanded stop.

Adding the ability to stop at an intermediate position in such pneumatic systems is very desirable, however, such friction braking tends to add significant mechanical and pneumatic complexity and additional expense to the system. Moreover, such systems can only be full on or full off at any position along the actuator stroke, thus, by their very nature they are inflexible. Moreover, such systems tend have good accuracy only at low speeds.

Robohand, Inc. of Monroe, Conn., manufactures pneumatic position control systems under the tradename POSITIONEX™. These systems include a pneumatic servo-actuator having a piston moveable in, and subdividing, a cylinder into a first and second chamber. They also include an output shaft interconnected to the piston, a position transducer providing a signal of a position of the output shaft and a servo-valve controlled by a control system to apply the appropriate pressure to position the output shaft at the appropriate predetermined position. Problematically, such systems tend to overshoot and hunt (oscillate about) the desired stopping position. Moreover, the servo-valves tend to be very complex and expensive.

Accordingly there has been a long felt, and unmet need for a cost effective pneumatic actuator and positioning system which is capable of accurately stopping at any point along its stroke.

SUMMARY OF THE INVENTION

The present invention provides a controllable pneumatic actuator and motion control apparatus including a field responsive medium and control method therefor whose motion may be accurately controlled at any point along its stroke. According to the invention, the controllable pneumatic apparatus comprises a pneumatic actuator coupled to a linear-acting brake such that a motion (e.g., a displacement, a velocity or an acceleration) of an output member of the actuator may be precisely controlled.

The apparatus preferably includes a control system having a sensor for deriving a motion signal of a motion of a moving component of the apparatus, and a motion control for processing the motion signal and providing a control signal to the controllable brake. The actuator is included in a pneumatic system that further comprises a pressure supply providing a supply of pressurized gas and a pneumatic control controlling a pneumatic control valve for apportioning the pressurized gas from the source and providing differential pneumatic pressure to move the piston. The apparatus preferably includes a control system further comprising an input for inputting information to the pneumatic control and the motion control.

The apparatus is preferably controlled according to a method in which the motion of the output member is controlled based upon a kinetic energy in the system. Most preferably, the control is also based upon an available braking force from the brake. More particularly, a shut down point for turning off the pneumatic actuator and activation of the controllable brake is determined based upon the kinetic energy and the available braking force.

According to the invention, a controllable pneumatic apparatus is provided comprising a pneumatic actuator having a housing with a gas cavity formed therein, a first piston slidably disposed in the gas cavity subdividing the gas cavity into first and second gas chambers, and an output member coupled to the first piston; and a controllable brake, including a medium containing cavity subdivided into a first and second chambers, a second piston rigidly interconnected with, and longitudinally aligned with, the first piston and moveable in the cavity along the axial axis, a passageway interconnecting the first and the second chambers, a field responsive medium (e.g., a magnetic fluid) contained in the passageway, a field generator for producing a field to change a rheology of the medium upon exposure to the field causing a braking force to be applied to the output member to control motion thereof.

In one embodiment, the field generator comprises a coil mounted stationary inside the housing. In this embodiment, the first piston is formed of first and second faces which face away from each other and the second piston is formed of first and second surfaces which face towards each other. Preferably, the passageway comprises an annulus formed between a pole piece and a shaft.

According to another aspect of the invention, the controllable pneumatic apparatus comprises a pneumatic system including a housing having a gas cavity formed therein, a first piston slidably disposed in the gas cavity subdividing the gas cavity into a first gas chamber and a second gas chambers, a pressure source providing a supply of pressurized gas, a pneumatic control which controls a pneumatic valve to apportion the supply of pressure to the first and second gas chambers thereby providing differential pneumatic pressure to move the first piston along an axial axis, and an output member coupled to the first piston; a controllable brake including a medium containing cavity, a second piston subdividing the medium containing cavity into a first medium chamber and a second medium chamber, the second piston being longitudinally aligned with the first piston and rigidly interconnected by an interconnecting shaft to the first piston, the second piston moveable in the cavity along the axial axis, a passageway interconnecting the first and the second medium chambers, a magnetically controllable fluid contained in the passageway, a field generator further including a coil for producing a magnetic field to change a rheology of the fluid upon exposure to the magnetic field; a motion sensor for providing a motion signal representative of a motion of the output member; and a control system for processing the motion signal and providing a control signal to the controllable brake thereby controlling motion of the output member.

According to the invention, the controllable pneumatic apparatus also comprises a housing including first and second end caps, an intermediate member spaced between the end caps, a first sleeve intervening between the first end cap and the intermediate member, and a second sleeve intervening between the second end cap and the intermediate member, a pneumatic system, including a gas cavity formed by the second end cap, the intermediate member and the second sleeve, a first piston slidably disposed within the second sleeve and subdividing the gas cavity into a first and second gas chambers, a pressure source providing a supply of pressurized gas to the cavity, a pneumatic control which controls a pneumatic valve to apportion the supply of pressure to the first and second gas chambers thereby providing differential pneumatic pressure to move the first piston along an axial axis, and an output member coupled by an interconnecting shaft to the first piston; a controllable brake including a medium-containing cavity formed by the first end cap, the intermediate member and a first sleeve, a second piston positioned relative to the first sleeve and subdividing the medium-containing cavity into a first and second medium chambers, the second piston being longitudinally aligned with the first piston and rigidly interconnected by the interconnecting shaft to the first piston, the second piston moveable in the cavity along the axial axis, a passageway interconnecting the first and second medium chambers, a magnetically controllable fluid contained in the passageway, a field generator for producing a magnetic field to change a rheology of the fluid upon exposure to the magnetic field; a sensor for providing a motion signal representative of motion of the output member; and a control system for processing the motion signal and providing a control signal to the controllable brake thereby controlling the motion of the output member.

According to another aspect of the invention, the controllable pneumatic apparatus comprises a housing including first and second end caps, and a sleeve spaced between the end caps; a pneumatic system, including a gas cavity formed by the end caps, the sleeve and outwardly disposed axial faces of a piston assembly, the piston assembly including a first member, a second member and an interconnecting shaft, the piston assembly slidably disposed in the sleeve subdividing the gas cavity into a first gas chamber and a second gas chambers, a pressure source providing a supply of pressurized gas to the cavity, a pneumatic control which controls a pneumatic valve to apportion the supply of pressure to the first and second gas chambers thereby providing differential pneumatic pressure to move the piston assembly along an axial axis, and an output member coupled to the piston assembly; a controllable brake including a medium containing cavity formed by the first sleeve and inwardly disposed axial surfaces of the piston assembly, and a partition subdividing the medium containing cavity into a first medium chamber and a second medium chamber, a passageway formed between the interconnecting shaft and the partition, the passageway interconnecting the first and the second medium chambers, a field responsive medium contained in the passageway, a field generator for producing a field to change a rheology of the medium upon exposure to the field; a sensor for providing a motion signal representative of a motion of the output member; and a motion control for processing the motion signal and providing a control signal to the controllable brake thereby energizing the field generator and controlling motion of the output member.

According to another aspect of the invention, a method of controlling a controllable pneumatic apparatus is provided comprising the steps of: providing a pneumatic actuator which causes motion of an output member, providing a controllable brake coupled to the output member, providing a control system for controlling the pneumatic actuator and the controllable brake, inputting system performance information to the control system, measuring a motion of the output member and providing a motion signal, processing the motion signal and the desired motion information within the control system and providing control signals to control the pneumatic actuator and to activate the controllable brake, the processing being based upon a kinetic energy. More preferably, the processing is based upon available braking force, as well. According to a preferred aspect, the system performance information comprises desired motion information of the output member such as the desired stopping position, a desired accuracy, a desired velocity profile, an acceleration profile, a mass of any moving system elements, a braking force available from the controllable brake or combinations thereof. Preferably, the shut down point is determined based upon the kinetic energy and the available braking force. Most preferably, the shut down point is determined based upon the equation:

$$\Delta x = \frac{mv^2}{2F_{mr}},$$

where $\Delta x$ is the distance from the shut down point to the desired stopping position, m is the mass of any moving system components, v is the velocity at the stopping point and $F_{mr}$ is the available braking force.

It is an advantage of the present invention that precise positioning of pneumatic actuators may be accomplished for assembly, packaging and other industrial automation applications.

It is an advantage of the present invention that it provides a stiff actuator when stationary as compared to servo-pneumatic positioning apparatuses of the prior art.

It is an advantage of the present invention that various velocity or acceleration profiles may be implemented during stopping, starting and during travel.

It is an advantage of the present invention that progressive braking/acceleration is allowed as compared to pneumatic systems including friction brakes.

It is an advantage of the present invention that precise positioning is accomplished within a very compact and cost effective package.

It is an advantage of the present invention that it is insensitive to environmental contaminants.

It is an advantage of the present invention that the control method allows optimization for accuracy or velocity based upon the kinetic energy of the system.

The above-mentioned and further features, advantages and characteristics of the present invention will become apparent from the accompanying descriptions of the preferred embodiments and the attached drawings.

BRIEF DESCRIPTION OF THE DRAWINGS

The invention will become better understood by reference to the description that follows, in conjunction with the appended drawings, in which.

DETAILED DESCRIPTION OF THE PREFERRED EMBODIMENTS

Figure 1A:
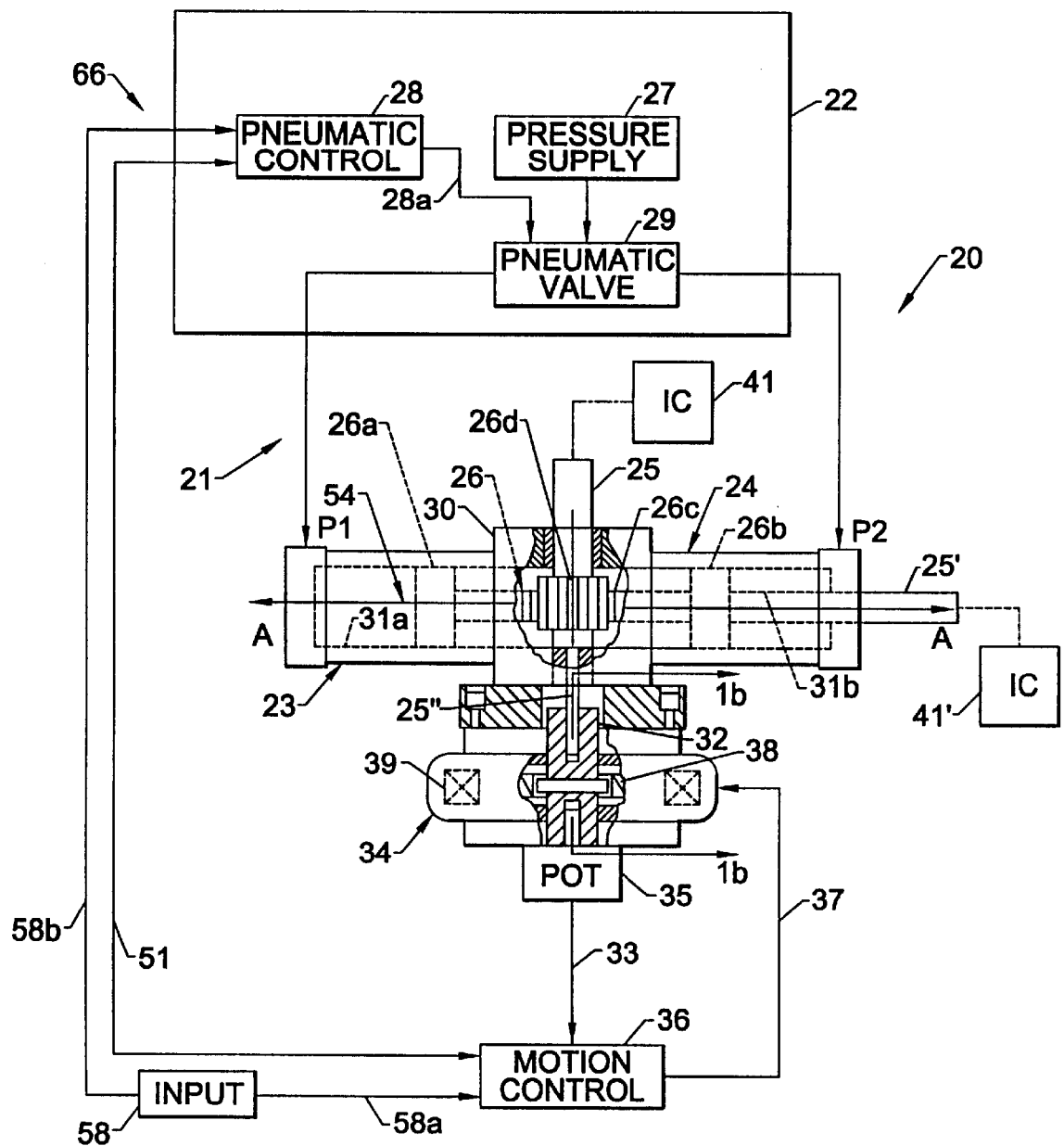
FIG. 1a is a schematic view of a first embodiment of controllable pneumatic actuator and motion control apparatus in accordance with the present invention.

A controllable pneumatic actuator and motion control apparatus 20 according to the invention is first illustrated in FIG. 1a. The apparatus 20 comprises a pneumatic actuator 23 and an interconnected and coupled rotary-acting controllable brake 34, such as a rotary-acting magnetorheological brake (e.g. MRB-2107-3 sold by Lord Corporation under the tradename RHEONETIC™ rotary controllable brake). An output member 25, such as an axially-reciprocating or rotary-acting shaft, is coupled (interconnected such that force may be applied therebetween) to a moving piston 26 of an actuator 23 included within the pneumatic system 21. The rotary-acting controllable brake 34 controls a motion parameter of the output member 25, such as a stopping position (displacement), a velocity, an acceleration or a starting or stopping velocity or acceleration profile thereof.

In more detail, the pneumatic system 21 includes the pneumatic actuator 23 and a pneumatic control system 22 for supplying pressure to, and causing motion of the output member 25 of the actuator 23. The pneumatic control system 22 includes a pneumatic pressure source or supply 27, such as a reservoir (not shown) of pressurized gas (e.g., air) which may be replenished by and pump (not shown). Preferably, the pressure supply 27 is regulated to a preset pressure, for example, to a presure in the range of between approximately 30 psi and 120 psi (207 kPa and 827 kPa), depending upon the application.

The pneumatic control system 22 also includes controllable pneumatic valve 29, such as a three-position solenoid valve (e.g. model SY5440 available from SMC Corporation of Tokyo, Japan), or any other type of suitable controllable valve. The valve 29 is operable in response to control signals 28a generated by a pneumatic control 28 to appropriately apportion pressure to the pneumatic actuator 23. For example, the valve 29 may include a first position which causes a differential pressure where the pressure P1 in a first gas chamber 31a is higher than the pressure P2 in a second gas chamber 31b thereby causing the piston 26 to move in a first (e.g. rightward) direction. The valve 29 may also include a second position causing the pressure P1 to be lower than the pressure P2 thereby causing motion of the piston 26 in the opposite (e.g. leftward) direction. Finally, the valve 29 may include a neutral position which provides pressures P1, P2 in the chambers 31a, 31b that are equal to atmospheric pressure thereby causing no differential pressure and allowing the piston 26 to come to rest.

The pneumatic actuator 23 includes a piston 26 (including elements 26a, 26b and an intervening rack 26c) preferably disposed in sealed relation with the cylindrically-shaped cavity 54 formed in a housing 24. The piston 26, which includes preferably cylindrically shaped elements 26a, 26b, is slidably received within, and subdivides, the cavity 54 and forms two opposed gas chambers 31a, 31b; the piston 26 being reciprocatably moveable along a central axis A—A of the housing 24. The piston 26 is coupled to, and movement of it produces movement of, at least one output shaft 25. In the FIG. 1a embodiment, the actuator 23 includes first 25 and a second 25' output members. The actuator's output member 25, 25' may be a rotatable output shaft 25 or a axially moveable piston rod shaft 25'.

The actuator 23 may also include a transmission 30, which, for example, converts linear motion of the piston 26 to rotary motion of the shaft 25. The transmission 30 may include a rack 25c and pinion 25d or other gearing system for converting linear to rotary motion, as is well understood by those of ordinary skill in the art. The transfer shaft 25" extending from the other side of transmission 30 is coupled to the transmission 30 and is, therefore, interconnected and coupled to, and moves in unison with, the piston 26 and output members 25, 25'. As should be recognized, the output member 25 is coupled to the piston 26 via the pinion 26d and the output member 25' is coupled to the piston 26 by a rigid interconnection to the cylindrical element 26b. Moreover, it should be recognized that applying appropriate pressures to the chambers 31a, 31b will cause motion of the cylindrical elements 26a, 26b and, thus, the rack 26c and pinion 26d and coupled output members 25, 25'.

Figure 1B:
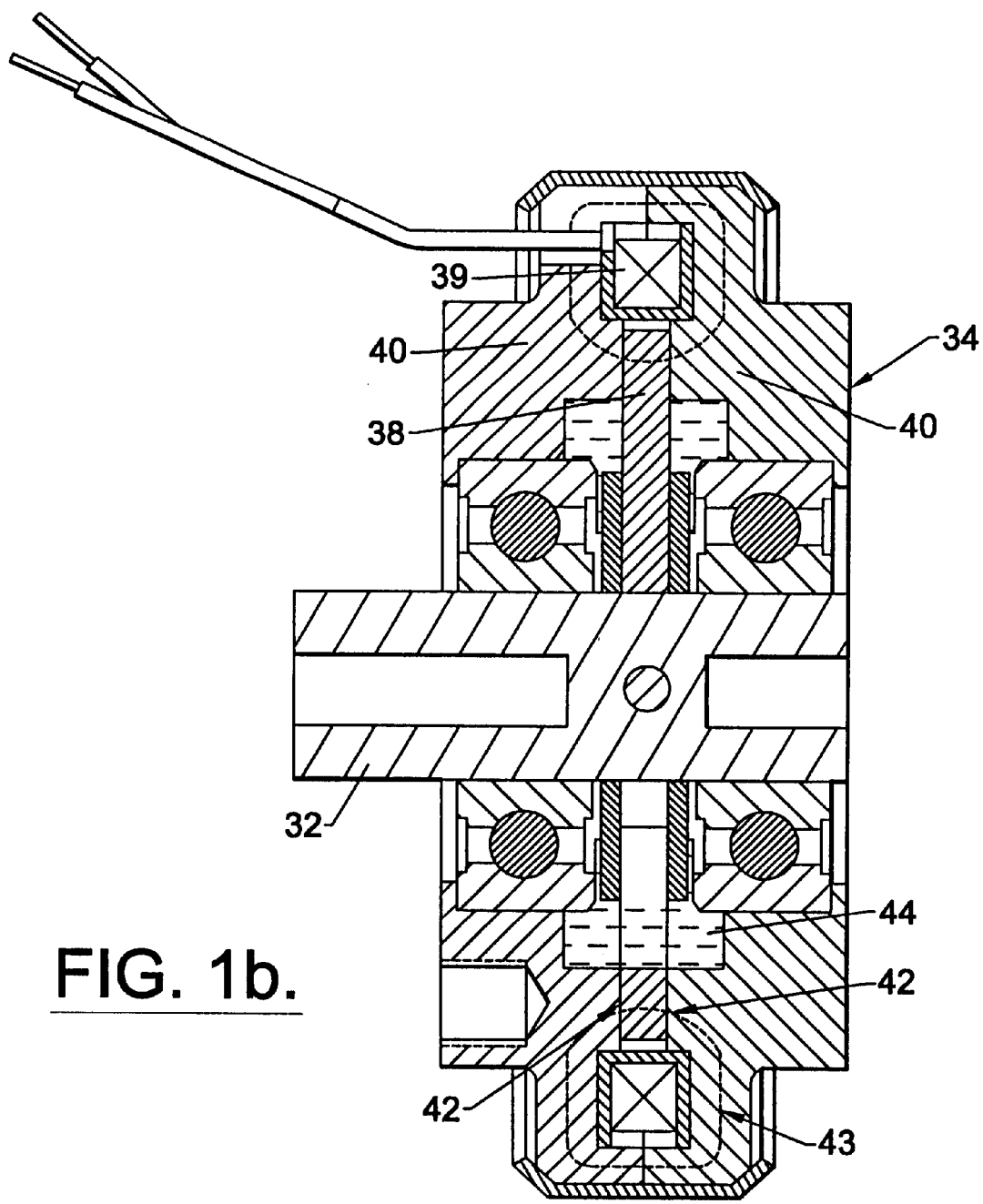
FIG. 1b is a cross-sectioned side view of the rotary-acting controllable brake of FIG. 1a taken along line 1b—1b.

The rotary-acting controllable brake 34 includes a field responsive medium 44 contained therein and is coupled to the piston 26, preferably through the transmission 30 or other suitable means. The rotary brake 34, as best shown in FIG. 1b, includes a brake shaft 32 coupled (e.g. by pin) for rotation with a disc-shaped rotor 38 manufactured from a soft-magnetic material, such as low carbon steel. A magnetic field generator 39, such as a magnet wire coil circumferentially wound (100–300 winds of wire) about a plastic bobbin, produces a magnetic field 43 upon being activated with suitable electrical current (e.g. 1–3 amps). Pole pieces 40 manufactured of a soft-magnetic material direct the flux across the preferably radially directed gaps 42 formed between the poles 40 and the rotor 38. Alternatively, the gaps 42 may be disposed axially or in other suitable orientations, as is known to those of ordinary skill in the art. The gaps 42 contain a field responsive medium 44, such as a magnetorheological fluid or dry magnetic particles. A suitable magnetorheological fluid is described in commonly assigned U.S. Pat. Nos. 5,599,474, 5,683,615 or 5,705,085. A suitable dry magnetic particle is manufactured from 410 series stainless steel power and sifted through a minus 325 mesh and is available from Hoeganaes Corpration of Riverton, N.J. under the tradename ANCOR® 410L. Application of the magnetic field 43 (shown dotted) formed by energizing the field generator 39 with suitable electrical current causes a change in the rheology, i.e., the apparent viscosity, of the medium 44 contained in the gaps 42. This rheology change creates a resistance torque between the rotor 38 and poles 40, thus making it hard to turn the shaft 32. The relative resistance to rotation of the rotor 38 may be smoothly variable based upon the applied electrical current. When the output shaft 32 of the controllable brake 34 is coupled to the piston 26, application of such current to the brake 34 may be controlled to stop the actuator's piston 26 at any intermediate point along its stroke. Alternatively, the brake may be activated to control the velocity or acceleration profile during startup, stopping, or at any point along its travel.

Rotary brakes such as described herein are described in detail in U.S. Pat. No. 5,842,547 to Carlson et al. entitled "Controllable Brake," U.S. Pat. No. 5,816,372 to Carlson et al. "Magnetorheological Fluid Devices And Process Of Controlling Force In Exercise Equipment Utilizing Same," and U.S. Pat. No. 5,711,746 to Carlson entitled "Portable Controllable Fluid Rehabilitation Devices."

Again referring to FIG. 1a, the apparatus 20 further includes a sensor 35, such as a rotary potentiometer (POT), for providing a motion signal 33 representative of a motion (e.g., a position, velocity or acceleration) of a moving component of the apparatus 20. For example, the sensor 35 may measure the motion (e.g., displacement) of the piston 26. Alternatively, a sensor 35 may sense motion between the output member shaft 25 or 25' and the housing 24 or of the interconnected component 41 or 41' relative to the housing or some other stationary point. The interconnected component 41 or 41' may be, for example, a caliper, manipulator, a pusher block, a tool plate, a carriage, a platform or other item useful for grasping, contacting or positioning an article such as a device, product, computer chip, or subassembly component to be assembled in a larger assembly.

A motion control system 36, such as a position control, processes the motion signal 33 and provides an electrical control signal 37 to the controllable brake 34. The control signal 37 energizes the field generator 39 in the brake 34 causing a resistance force to be applied to the output shaft 32, and to interconnected shaft 25, 25', piston 26, and to any interconnected component 41, 41' thereby controlling at least one selected from a group consisting of a position, velocity and acceleration of the output member 25, 25' and, thus, of the interconnected component 41 or 41'.

Figure 2:
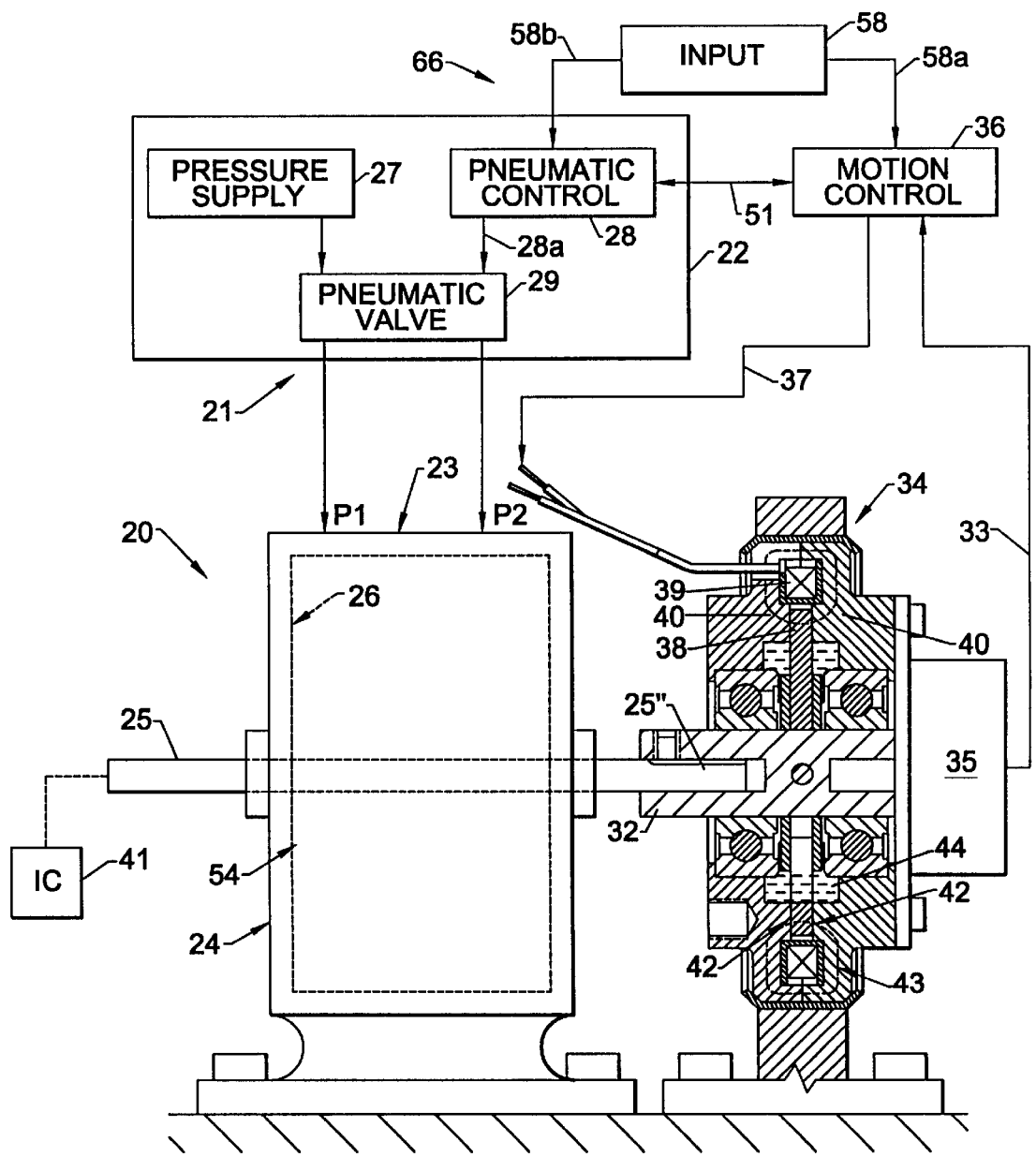
FIG. 2 is a schematic view of a second embodiment of apparatus in accordance with the present invention.

FIG. 2 illustrates another embodiment of the apparatus 20. In this embodiment, the pneumatic actuator 23 comprises a rotary-acting pneumatic motor including a piston (rotor) 26 rotatably mounted for rotation in the housing 24. Application of a differential pressure to the piston 26 by the pneumatic control system 22 causes the rotation of the piston 26. Preferably, a rotary-acting controllable brake 34 identical to that described in FIG. 1b is coupled to the piston 26 by transfer shaft 25". A flexible coupling may be included if desired. Optionally, the housing of the brake 34 may be mounted directly to the housing 24 of the actuator 23.

The control system 66 includes a motion control 36, a pneumatic control system 22 and an input 58 and collectively controls the motion of the actuator 23 and brake 34 and, thus, the motion of the output member 25 and interconnected component 41. As will be described in more detail later, the sensor 35 provides a motion signal 33 to the motion control 36 and to the pneumatic control 28 via the data interconnection 51. The controls 36, 28 process the input data regarding desired motion 58a, 58b and the instantaneous motion signal 33 from sensor 35 to derive: 1) a control signal 28a to be provided to the pneumatic valve 29, and 2) a control signal 37 to the controllable brake 34.

Figure 3:
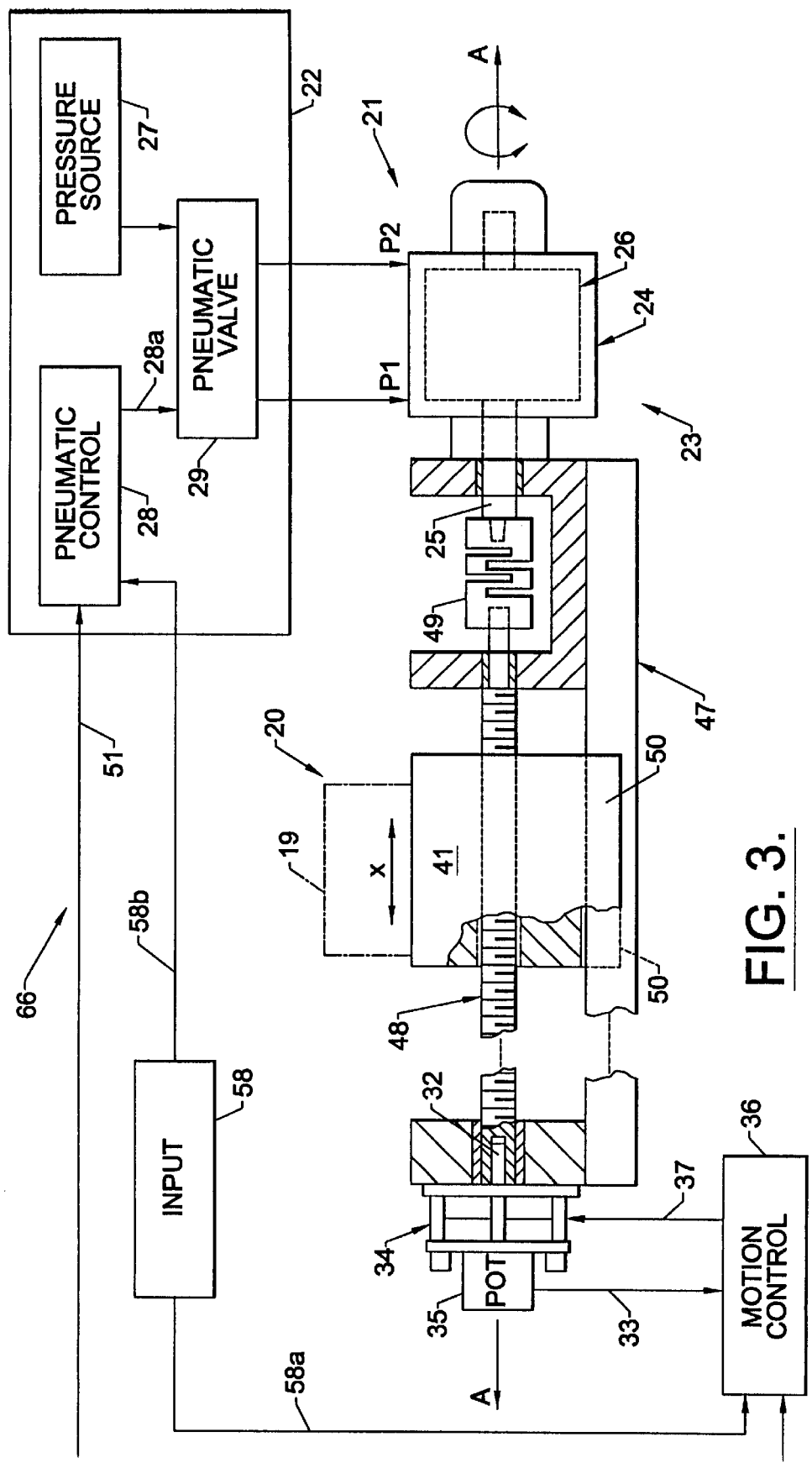
FIG. 3 is a schematic view of a third embodiment of apparatus in accordance with the present invention.

FIG. 3 illustrates another embodiment of the apparatus 20. In this embodiment, the pneumatic system 21 includes an actuator 23, such as rotary pneumatic motor, for example, the one HP model 2AM-NRV-589 manufactured by Gast Manufacturing Corporation of Benton Harbor, Mich. The actuator 23 includes a housing 24 and a rotor-like piston 26 supported for rotary motion therein. An output member shaft 25 is coupled to the piston 26 and rotates in unison therewith. The actuator 23 is securely mounted on a frame 47 (a portion of which is shown in cross section). Interconnected to the output shaft 25 by a misalignment coupling 49, and supported in bushings at the ends of frame 47, is a threaded power screw member 48. An interconnected component 41 (a carriage) is threaded onto, and mounted on, the threaded power screw member 48. Downward extensions 50 ride on either side of the frame 47 and prevent rotation of the component 41 relative to the frame 47.

Secured to the frame 47 at the other end of the apparatus 20 is the rotary-acting controllable brake 34. The brake shaft 32 of brake 34 is interconnected, and coupled, to the power screw member 48 thereby coupling it to the output shaft 25 of the actuator 23. A flat (not shown) or other suitable means formed on the shaft 32 prevents rotation between the shaft 32 and the power screw member 48. The brake 34 herein is the same in construction as the brake previously illustrated in FIG. 1b and its energization by the motion control system 36 causes a breaking torque to be exerted between the frame 47 and the power screw member 48 thereby controlling its stopping position, its velocity or acceleration characteristics. Preferably, the control method stops the interconnected component 41 at a desired position $x_{des}$ (axial or rotary) with the end result of positioning the article 19 at the appropriate position.

For example, as the actuator 23 is shut off by the pneumatic control 28, the inertia of the system components (e.g., the component 41, article 19, member 48, coupling 49 and internal components of actuator 23 ) will cause the component 41 to continue to move along for some finite distance. By engaging the brake 34 at the appropriate time, the component 41 may be stopped precisely and quickly at any desired position $x_{des}$. Accordingly, the motion control 36 may receive appropriate information from the pneumatic control 28 through data interconnection 51, or visa versa, such that the action of the actuator 23 and the brake 34 are appropriately coordinated. The desired stopping position $x_{des}$, desired velocity or acceleration profile is input via the input 58 for controlling the motion of the output member 25. Notably, in some cases, it may be desirable to fully engage the brake 34 slightly before shutdown of the actuator motor 23. Moreover, sensor information, such as position, velocity or acceleration from the sensor 35 may be provided to the pneumatic control 28 via data interconnection 51. Thus, the controls 28, 36 may be programmed to precisely stop the component 41 at any axial position along the axial axis A—A. Desirable control methods are described with reference to FIGS. 8–9 later herein.

FIGS. 4–7 illustrate four alternate embodiments of the controllable pneumatic actuator and motion control apparatus 20. In each of these embodiments, the pneumatic actuator 23 is positioned longitudinally in line with a linear-acting brake 34. According to the invention, an apparatus 20 is provided comprising a pneumatic actuator 23 coupled with a linear-acting controllable brake 34 which together cooperate to precisely control the motion of an output member 25 and, thus, the motion of an interconnected component 41 relative to a mounting member 18. In all embodiments of FIGS. 4–7, the output member 25 is preferably a piston rod shaft and is coupled to the piston 26.

The pneumatic system 21 includes a pneumatic actuator 23 and a pneumatic control system 22. The actuator 23 includes a housing 24 with a generally cylindrically-shaped gas cavity 54 formed therein. A first puck-shaped piston 26 is slidably disposed in the gas cavity 24 and subdivides it into first 31a and second 31b gas chambers. A pressure source 27 (e.g. a reservoir and pump, etc.) provides a supply of pressurized gas at a regulated pressure (30–120 psi) as described above. As part of the control system 66, the pneumatic control 28 controls the operation of a pneumatic valve 29 to properly apportion the supply of pressure to the gas chambers 31a, 31b in accordance with predetermined input 58b from the input 58. This provides differential pneumatic pressure (P1>P2 or P2>P1) to move the first piston 26 rightwardly or leftwardly along the axial axis A—A. An output member 25, such as a piston rod shaft, is coupled to the first piston 26. Interconnected to the output member 25 is the interconnected component (IC) 41 which may be, for example, a caliper, manipulator, a pusher block, a platform or other item.

The controllable linear-acting brake 34 includes a cylindrical medium containing cavity 53 which is subdivided into first 52a and second 52b medium containing chambers. In the FIGS. 4–6 embodiments, the subdivision is by way of the second piston 45, whereas, in the FIG. 7 embodiment, the subdivision is via a piston assembly 65 including cylindrical members 67a, 67b interconnected by an interconnecting shaft 64. In the FIG. 7 embodiment, the first piston 26 is formed of first and second faces 62a, 62b which face outwardly away from each other. Contrarily, the second piston 45 is formed of first and second surfaces 63a, 63b which face towards each other. The term "piston" as used herein, means an element which broadly functions to displace fluid upon movement thereof or which is moveable in response to pressure applied thereto.

Figure 5:
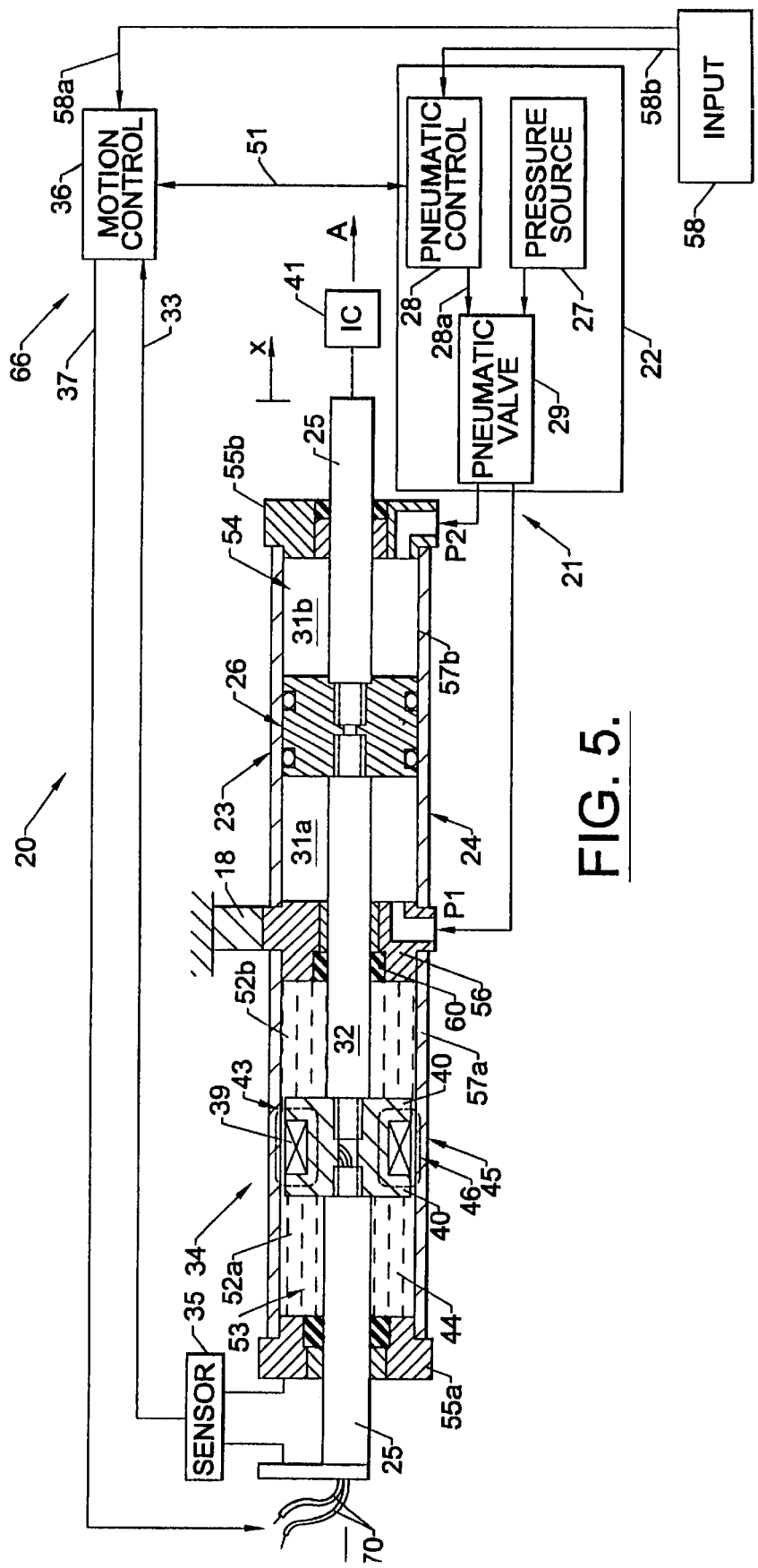
FIG. 5 is a schematic view of a fifth embodiment of apparatus in accordance with the present invention.
Figure 6:
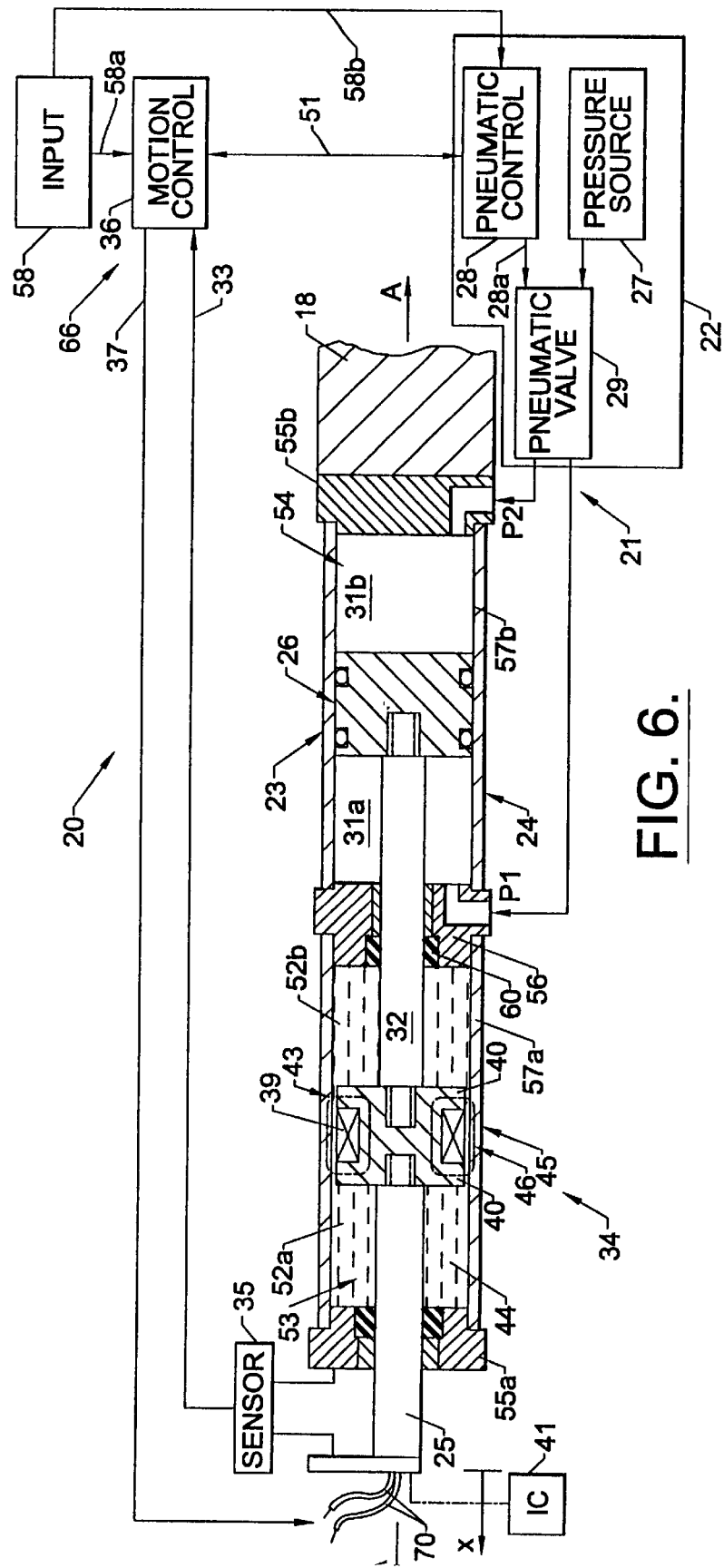
FIG. 6 is a schematic view of a sixth embodiment of apparatus in accordance with the present invention.
Figure 7:
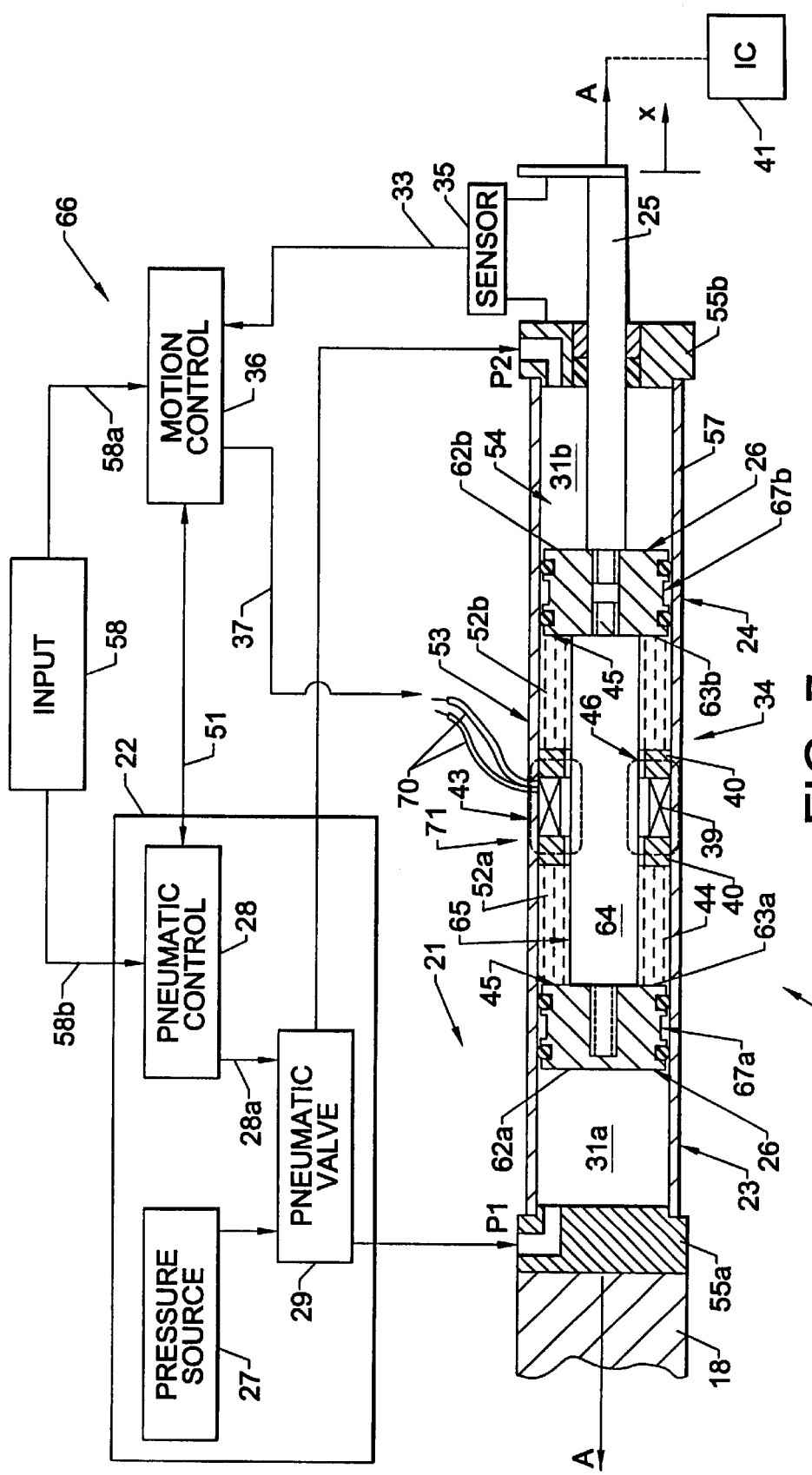
FIG. 7 is a schematic view of a seventh embodiment of apparatus in accordance with the present invention.

In the embodiments of FIGS. 4–7, the second piston 45 is rigidly interconnected with, and longitudinally aligned with, the first piston 26 and moveable within the cavity 53 along the axial axis A—A. In the FIGS. 4–6 embodiments, the rigid interconnection is by way of the interconnecting shaft 32. In FIG. 7, the rigid interconnection comprises the cylindrical elements 67a, 67b. Within the brake 34, a passageway 46 interconnects the first and the second medium containing chambers 52a, 52b. A field responsive medium 44 (e.g. a magnetically controllable fluid such as a magnetorheological fluid as is described in U.S. Pat. No. 5,683,615 entitled "Magnetorheological Fluid" or U.S. Pat. No. 5,705,085 entitled "Organomolobdenum-Containing Magnetorheological Fluid") is contained in the chambers 52a, 52b and the passageway 46.

A field generator 39, such as a wound magnet wire coil, when energized, produces a magnetic field 43 which is directed by pole pieces 40 to change the rheology of the medium 44 exposed thereto. In the FIGS. 4–6 embodiments, the coil 39 is mounted to the piston 45, whereas in the FIG. 7 embodiment, the coil 39 is immovably mounted to the inside surface of the cylindrical sleeve 57 of the housing 24. Energizing coil causes a braking force to be applied to both the first 26 and interconnected second 45 piston thereby allowing the motion (position, velocity or acceleration) of the output member 25 to be precisely controlled. For example, a stopping position of the output member 25 may be precisely controlled. Alternatively, the field may be an electrical field produced by supplying a sufficient voltage to spaced electrode plates spaced across the passageway. The voltage applied then would change the rheology of an electrorheological fluid, thus. applying a resistance force to brake the output member.

Figure 8:
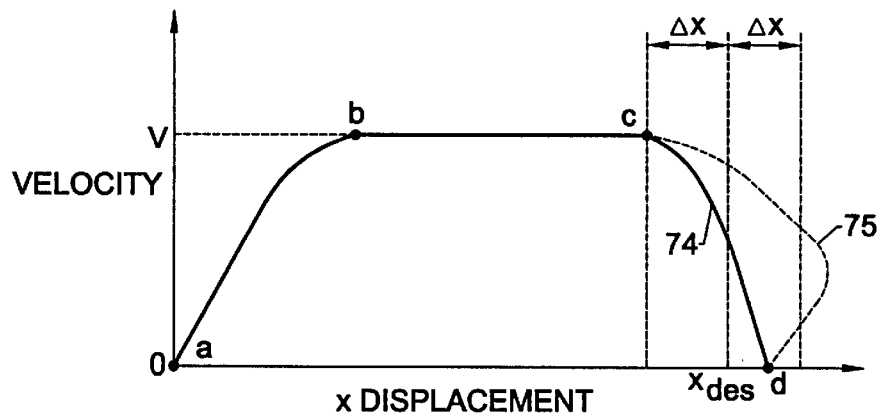
FIG. 8 is a plot of displacement versus velocity when one type of control method is implemented.

The control system 66 also includes a sensor 35, such as a linear position sensor, which supplies a motion signal 33 representative of an axial position, velocity or acceleration of a moving component of the apparatus 20 as described above (e.g. an axial position of the output member 25). Within the control system 66, the motion control 36 processes the signal 33 and the input motion information 58a from input 58 and provides a control signal 37 to the controllable brake 34. This controls at least one motion selected from a group consisting of a position, velocity and acceleration of the output member 25. For example, the input 58a, 58b may be input from a key pad, from a PC, from a Programmable Logic Controller (PLC), hard coded data into a micro-controller or electronic component or other suitable input means. As shown in FIG. 8, the input data 58a, 58b from input 58 may comprise: 1) the desired stopping position ($x_{des}$), 2) an error ($\Delta x$) about that stopping position, 3) a velocity profile for startup (from point a to point b), 4) a stopping velocity profile (from point c to point d), or 5) both, as well as 6) during the stroke (from point b to point c), or 7) an acceleration profile at any point along the stroke. Herein, the terms x, $x_{des}$ and $\Delta x$ are used to denote linear translational motions or rotational motions, depending upon the type of apparatus 20.

Figure 9:
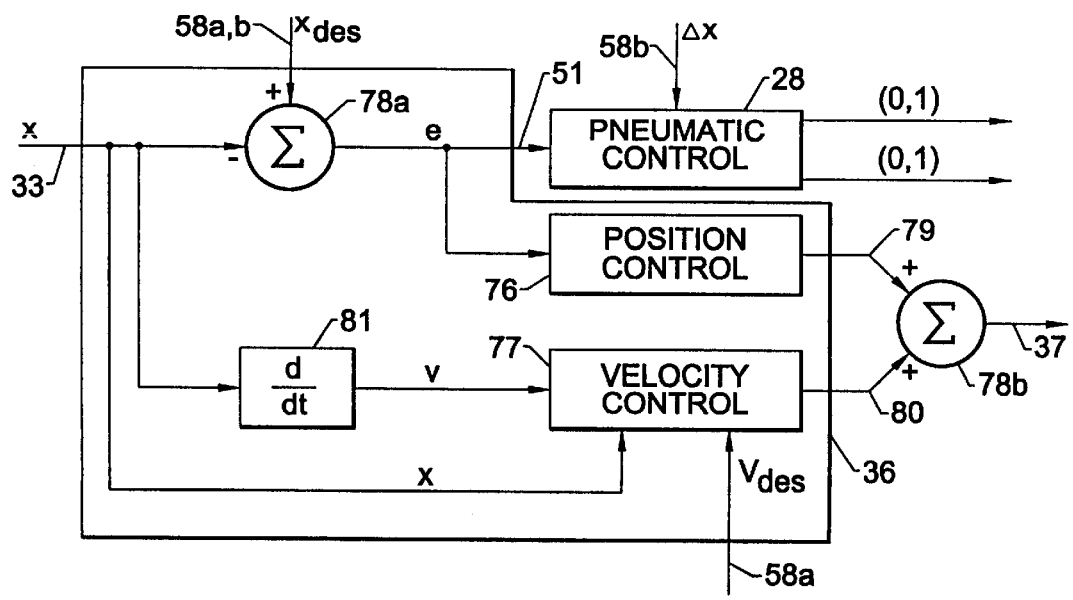
FIG. 9 is a block diagram of one type of control method.

For example, in a simple control method for controlling the apparatus 20 illustrated in FIGS. 8 and 9, control logic in the pneumatic control 28 turns off the pneumatic actuator 23 upon sensing a rotation or displacement signal 33 (x) from sensor 35 which is approximately equal to the desired position (e.g., $x_{des}$) by sending an appropriate signal 28a to the pneumatic valve 29. The motion control 36 then activates the brake 34 to generate a braking force or torque and decelerate the output member 25 and stop its motion (axial or rotary). In actuality, the turning off of the pneumatic actuator 23 and activation of the brake 34 both occur preferably simultaneously upon entering a predetermined tolerance band $\Delta x$ surrounding the desired stopping position $x_{des}$. This braking force controls the motion (rotational or translational displacement, velocity or acceleration), as desired, of the output member 25 at any desired point along its stroke.

To illustrate the control aspects, reference is again directed to FIGS. 8–9 wherein the output member 25 is initially positioned at some point, for example, at point a. The pneumatic control 28, based on an input signal 33 from the sensor 35 transmitted via data interconnection 51 and signals 58b of the target position $x_{des}$ input from the input 58, via control logic commands the valve 29 to move the member 25 in a first direction. System dynamics and flow capacity/characteristics determine the slope and rate of acceleration to a maximum velocity between points a and b in FIG. 8. Notably, this profile may also be precisely controlled, as desired, by application of low level braking forces. Upon reaching the desired speed, application of a low level control signal 37 by the motion control 36 will set the actual velocity v from points b to c to a value $v_{des}$ commanded by the input 58a. Upon entering the tolerance band Δx at point c, the control logic of motion control 36 generates a higher level control signal 37 to further energize the field generator 39. This creates a strong magnetic field which acts upon and changes the rheology (apparent viscosity) of the medium 44 and produces a braking force which controls the motion of the output member 25 almost instantaneously.

In the case where the kinetic energy of the system is low and the braking force is adequate, the output device 25 comes to a stop within the band Δx at point d following a direct path 74. However, if the system kinetic energy is high or the braking force available is inadequate, then the apparatus 20 may hunt, i.e., exceed the tolerance band Δx on the right side and cause the pneumatic control 28 to be momentarily actuated to drive the output member 25 back in the opposite direction along indirect path 75 and back into the tolerance band Δx, thus again bringing the member 25 to rest within the tolerance band at point d. Moreover, as suggested above, it may be desirable under some circumstances to control the acceleration/deceleration or the velocity profiles between points a–b and c–d. In this case, the desired velocity profile is input via the input 58 and to a velocity control 77 of the motion control 36. It should be recognized that a similar control may be utilized for control of the FIGS. 1a, 2 and 3 embodiments where the signal 33 comprises a rotational position, the velocity is a rotational velocity.

As should be recognized also, the various controls 28, 36 of the control system 66 may be implemented in separate logic or electronic modules, in a single logic or electronic unit or by any other suitable means. As shown in FIG. 9, at junction 78a the position information $x_{des}$ is subtracted from the measured displacement signal 33 (representative of the position x) derived from sensor 35 to produce an error signal e. Within the pneumatic control 28, the error and the Δx information are compared in logic. If the error e is above positive and greater than the Δx value then the logic dictates a 0,1 output control signal 28a to valve 29 causing the piston 26 to move towards the desired position $x_{des}$. Contrarily, if the error e is negative and greater than the Δx value then the logic dictates a 1,0 output control signal 28a to valve 29 causing the piston to move towards (in the opposite direction) the desired position $x_{des}$. In each of these cases, the control signal provided via the position control 76 would preferably be zero. The velocity control 77 may provide a low level velocity control signal 80 to achieve the desired velocity $v_{des}$ 58a input from the input 58 for any point along the stroke. The velocity control 77 may perform any desired velocity profile, which may be a function of position information x. If the error e is less than the Δx value, then the pneumatic control 28 send out a 0,0 control signal 28a to the valve 29 which is the neutral position of the valve 29. Simultaneously upon sensing entry into the tolerance band by the position control 76, i.e., where e=Δx, the logic causes the brake 34 to be activated to add a position control signal 79 at junction 78b which sums with any velocity control signal 80 present and thereby produces a substantial braking force to stop the motion of the output member 25 within the tolerance band.

According to a more sophisticated control method of the invention, the brake 34 is activated to a high level at a calculated shut down point $x_0$ before the desired stopping point $x_{des}$ based upon the kinetic energy in the system and upon the braking force available from the brake 34. In essence, if the kinetic energy and the braking force available are known quantities, then the exact time to shut down the pneumatic actuator 23 and apply the brake 34 is easily and readily determined for any desired position $x_{des}$. This hereinafter will be referred to as "kinetic energy control."

Kinetic energy control virtually eliminates overshoot and hunting associated with prior art methods, especially on systems where the system inertia is large. In particular, according to the kinetic energy control method, the kinetic energy of the system is equated with the braking energy in the system (see eqn. 4–6 below) to provide an intelligent tradeoff between accuracy and speed.

The energy associated with the controllable magnetorheological brake 34 is given by:

$$E_{mr} = \int_x F_{mr} dx = F_{mr}(x_{des} - x_0) \tag{1}$$

where $E_{mr}$ is the braking energy available, $F_{mr}$ is the braking force available, $x_{des}$ is the desired stopping position (rotary or linear), and $x_0$ is a shut down position (rotary or linear) away from the desired position where if the force available were applied, it would bring the output member 25 to a stop at the position $x_{des}$.

The kinetic energy of the system at $x_0$ is:

$$E_k = \frac{1}{2}mv^2 \tag{2}$$

where $E_k$ is the kinetic energy at $x_0$, m is the mass (or rotational inertia) of the moving components in the system including the payload article 19, and v is the velocity (rotary or linear) of the output member 25 at $x_0$. In order to bring the mass m to a stop at the target position $x_{des}$, the kinetic energy $E_k$ must be equal to the braking energy $E_{mr}$. Setting the values equal to each other provides:

$$E_k = E_{mr} \tag{3}$$

and substitution provides:

$$\frac{1}{2}mv^2 = F_{mr}(x_{des} - x_0) \tag{4}$$

and $$\Delta x = x_{des} - x_0 \tag{5}$$

and, finally $$\Delta x = \frac{mv^2}{2F_{mr}} \tag{6}$$

rearranging into another form gives:

$$v = \sqrt{\frac{2F_{mr}\Delta x}{m}}. \tag{7}$$

Thus, it can be readily seen that Δx can be regarded as a position tolerance, and it is easily recognized that there is a tradeoff between positioning accuracy and positioning speed. Equation 7 becomes the basis for the kinetic energy control method, where the inputs provided via the input 58 are the desired rotational or translational accuracy Δx, the braking force available $F_{mr}$ and the mass or rotational inertia m. Thus, using these inputs, the point-to-point (e.g., point b to c of FIG. 8) velocity v can be controlled such that the resultant actual stopping position is substantially at $x_{des}$ without any substantial overshoot. As should be understood, the force $F_{mr}$ is a factory set value which may be updated via on-line learning.

Optionally, the input may include the mass m and the braking force available $F_{mr}$ (e.g. hard coded) and the velocity v (derived from the motion signal 33) to calculate the value Δx according to equation 6; the value Δx corresponding to where the pneumatic actuator 23 is shut down and the brake 34 is applied. In this case, the velocity v may be derived via differentiating the position signal in differentiator 81 (FIG. 9). Further, according to an alternate method, the accuracy desired Δx, the mass m and the desired velocity $v_{des}$ can be inputted via input 58 and an applied braking force F calculated and then applied to stop the output member 25 at the desired position. Known pairs of velocity $v_{des}$ and accuracy Δx would be input to ensure no overshoot.

Figure 4:
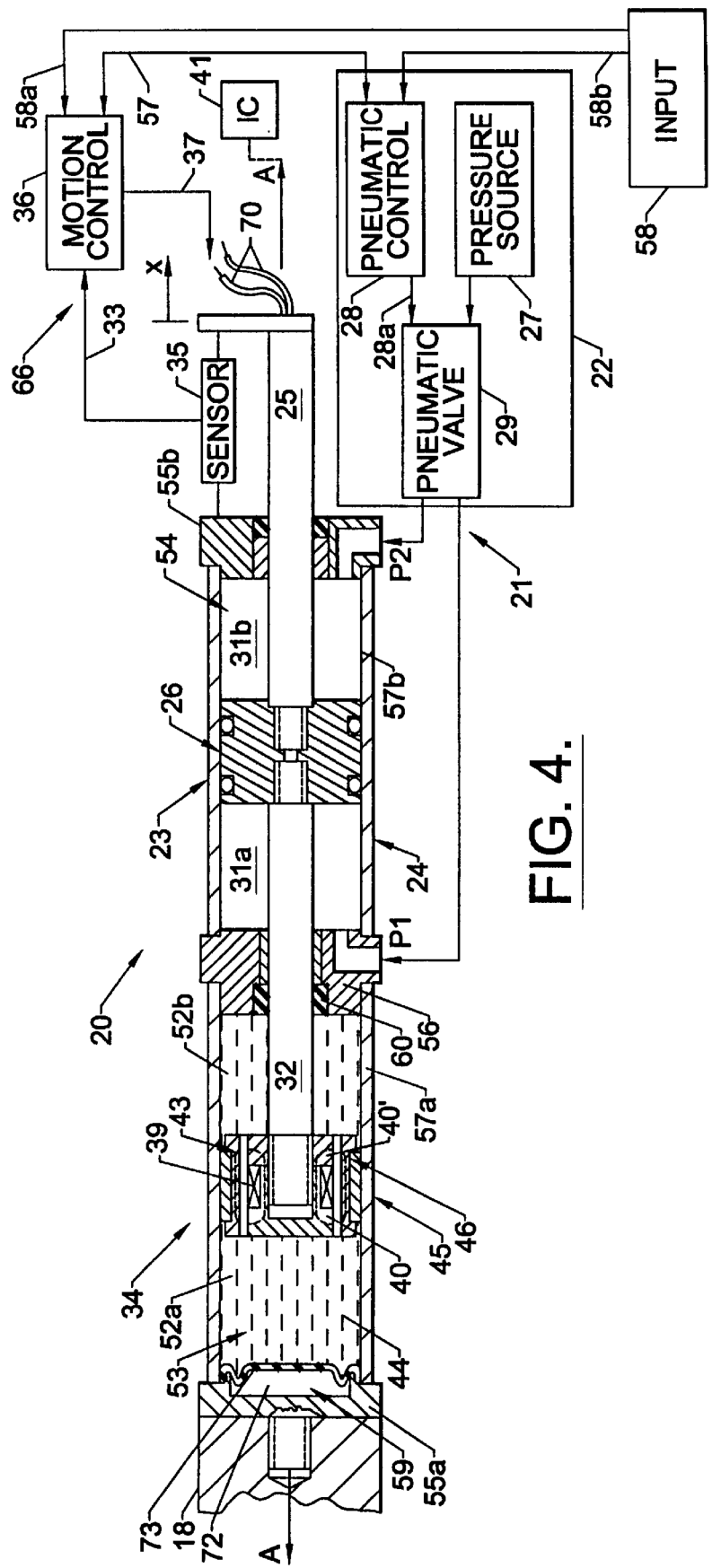
FIG. 4 is a schematic view of a fourth embodiment of apparatus in accordance with the present invention.

In the FIG. 4 embodiment, the passageway 46 passes through the piston 45. The construction of the piston 45 of FIG. 4 is identical to that taught in U.S. Pat. No. 5,878,851 to Carlson et al. entitled "Controllable Vibration Apparatus." Contrarily, in the FIGS. 5–6 embodiments, the passageway 46 comprises an annulus formed between the piston 45 and the housing 24 and the medium 44 passes about the piston 45. Piston constructions whereby the medium passes about the piston are taught in U.S. Pat. No. 5,277,281 to Carlson et al entitled "Magnetorheological Fluid Dampers." In the FIG. 7. embodiment, the passageway 46 comprises an annulus formed between the pole pieces 40 of a partition 71 and an interconnecting shaft 64 of magnetically-soft material. The coil 39 is mounted to the inside of the housing 24, thus, the wires 70 are desirably not subject to movement. The magnetic field 43 is carried by the sleeve 57, pole pieces 40 and the interconnecting shaft 64.

In each of the embodiments of FIGS. 4–6, the housing 24 comprises first and second rigid end caps 55a, 55b positioned at respective ends of the housing 24 and an intermediate member 56 spaced therebetween. A first sleeve 57a is disposed between the first end cap 55a and the intermediate member 56, and a second sleeve 57b is disposed between the second end cap 55b and the intermediate member 56. The sleeves 57a, 57b may be made of any rigid material, except that in the case of the FIGS. 5 and 6 embodiments, the sleeve 57a must be manufactured from a magnetically-soft material; the reason being that a portion of the field 43 generated by the generator 39 is carried in the sleeve 57a. The intermediate member 56 includes an elastomer seal 60 which seals about the shaft 32 to prevent flow of the field responsive medium 44 into the first and second gas chambers 31a, 31b. In the FIGS. 4–6 embodiments, the wires 70 are received through a bore (not shown) in the respective shafts.

In the FIG. 4 embodiment, the controllable brake 34 further comprises a volume compensator 59. The compensator 59 includes a gas charged chamber 72 and a flexible elastomeric partition 73. The compensator 59 functions to take up the volume of rod 32 as it reciprocates into the cavity 53 as well as any expansion of the medium 44 due to temperature variations. In the FIGS. 5–6 embodiment, the rod volume compensation issue is addressed by the addition of a second shaft 25 exiting from the cavity 53, such that the rod volume is always constant. In the FIG. 7 embodiment, the rod volume in the cavity 53 is constant, as well. Temperature compensation in the FIGS. 5–7 embodiments, if needed, may be provided by gas containing capsules or an external accumulator (not shown) attached to the housing 24 and interconnecting to the cavity 53. In each of the FIGS. 4–7 embodiments, the medium containing cavity 53 is formed within the housing 24.

In the FIGS. 5 and 6 embodiments, the apparatus 20 includes a first shaft 25 secured to the second piston 45 and received in sealed relationship through a first end cap 55a of the housing 24, and a second shaft 32 received in sealed relationship (via seal 60) through an intermediate member 56 of the housing 24. This results in an efficient construction with a minimum amount of seals and minimal size. In the FIGS. 4–6 embodiments, the gas cavity 54 is formed by an end cap 55b, an intermediate member 56 and a sleeve 57b similarly to the formation of the medium containing cavity 53.

The invention has been described in terms of preferred principles, method steps, and structure, however, the particular examples given are meant to be illustrative and not limiting. Substitutions and equivalents as will occur to those skilled in the art are included within the scope of the invention as defined by the following claims.

What is claimed is:

1. A motion control apparatus, comprising:
   (a) a pneumatically controlled actuator including a housing with a gas cavity formed therein, a first piston slidably disposed in the gas cavity, the first piston subdividing the gas cavity into first and a second gas-chambers, and an output member coupled to the first piston, the output member being movable in response to movement of the first piston, the first piston being moveable along an axial axis of the housing as a result of a differential pressure between the first and second chambers; and
   (b) a controllable brake for controlling the motion of the output member, the brake being coupled to the pneumatically controlled actuator, the brake including a medium containing cavity subdivided into a first and second chambers, a second piston rigidly interconnected with, and longitudinally aligned with, the first piston and moveable in the medium containing cavity along said axial axis, a passageway interconnecting the first and the second chambers, a field responsive medium contained in the chambers and passageway, a field generator for producing a field to change the rheology of the field responsive medium in the passageway upon exposure to the field causing a braking force to be applied to the output member to control motion thereof.

2. The apparatus of claim 1 further comprising a pneumatic system including a pressure source providing a supply of pressurized gas, a pneumatic control which controls a pneumatic valve to apportion the supply of pressure to the gas chambers thereby providing differential pneumatic pressure to move the first piston along an axial axis.

3. The apparatus of claim 1 wherein the field generator comprises a coil mounted stationary inside the housing.

4. The apparatus of claim 1 wherein the first piston is formed of first and second faces which face away from each other and the second piston is formed of first and second surfaces which face towards each other.

5. The apparatus of claim 1 wherein the second piston is comprised of a shaft having discrete piston end members at each shaft end, the brake further comprising a pole piece adjacent the shaft the passageway comprising an annulus formed between the pole piece and the shaft.

6. The apparatus of claim 1 wherein output member is coupled to the piston by an interconnecting shaft.

7. The apparatus of claim 1 wherein the field responsive medium comprises a magnetically controllable fluid.

8. The apparatus of claim 1 wherein the passageway comprises an annulus formed between the second piston and the housing.

9. The apparatus of claim 1 wherein the field generator comprises a coil mounted on the piston.

10. The apparatus of claim 1 wherein the housing comprises first and second end caps positioned at respective ends thereof.

11. The apparatus of claim 10 further comprising an intermediate member located between the first and second end caps.

12. The apparatus of claim 11 wherein the intermediate member includes a seal which prevents flow of the field responsive medium into the first and second gas chambers.

13. The apparatus of claim 11 further comprising a first sleeve disposed between the first end cap and the intermediate member, and a second sleeve disposed between the second end cap and the intermediate member.

14. The apparatus of claim 13 wherein the first sleeve is manufactured from a soft-magnetic material and carries a portion of the field.

15. The apparatus of claim 1 wherein the controllable brake further comprises a volume compensator.

16. The apparatus of claim 1 wherein the apparatus further comprises a position sensor for sensing the position of the output member, and supplies a motion signal representative of an axial position of the output member.

17. The apparatus of claim 1 wherein the output member motion that is controlled comprises an output member stopping position.

18. The apparatus of claim 1 wherein the medium containing cavity is formed within the housing.

19. The apparatus of claim 1 further comprising a first shaft secured to the first piston and received in sealed relationship through a first end cap of the housing, and a second shaft received in sealed relationship through an intermediate member of the housing.

20. The apparatus of claim 1 wherein the gas cavity is formed by an end cap, an intermediate member and a sleeve.

21. The apparatus of claim 1 wherein said apparatus is controlled according to a control method which controls motion of the output member based upon a kinetic energy.

22. The method of claim 21 wherein the apparatus further comprises controller means for determining the available braking force, the control method which controls motion of the output member is further based upon an available braking force.

23. The method of claim 1 wherein the apparatus further comprises controller means for determining the available braking force and a shut down point for activation of the controllable brake and shut down of the pneumatic actuator to stop the output member at the desired stopping position, and wherein the shut down point is determined based upon the equation:

$$\Delta x = \frac{mv^2}{2F_{mr}},$$

where $\Delta x$ is the distance from the shut down point to the desired stopping position, m is the mass of any moving system components, v is the velocity at the stopping point and $F_{mr}$ is the available braking force.

24. A motion control apparatus, comprising:

(a) a pneumatically controlled actuator including a housing with a gas cavity formed therein, a first piston slidably disposed in the gas cavity, the first piston subdividing the gas cavity into first and a second gas chambers, and an output member coupled to the first piston, the output member being movable in response to movement of the first piston, the first piston being movable along an axial axis of the housing as a result of a differential pressure between the first and second chambers;

(b) a controllable brake for controlling the motion of the output member, the brake being coupled to the pneumatically controlled actuator, the brake including a medium containing cavity subdivided into a first and second chambers, a second piston rigidly interconnected with, and longitudinally aligned with, the first piston and moveable in the medium containing cavity along said axial axis, a passageway interconnecting the first and the second chambers, a field responsive medium contained in the chambers and passageway, a field generator for producing a field to change the rheology of the field responsive medium in the passageway upon exposure to the field causing a braking force to be applied to the output member to control motion thereof; and (c) a pneumatic supply system including a pressure source for providing a supply of pressurized gas to the gas cavity.

\* \* \* \* \*